US012709542B2

(12) United States Patent
Suman et al.

(10) Patent No.: US 12,709,542 B2

(45) Date of Patent: Aug. 18, 2026

(54) FREE FLOWING SODIUM NITRITE AND METHOD OF PRODUCTION

(71) Applicant: DEEPAK NITRITE LIMITED, Vadodara (IN)

(72) Inventors: Sanjay Kumar Suman, Vadodara (IN); Jignesh R Desai, Vadodara (IN); Sanjay Bhalekar, Vadodara (IN)

(73) Assignee: DEEPAK NITRITE LIMITED, Vadodara (IN)

( * ) Notice: Subject to any disclaimer, the term of this patent is extended or adjusted under 35 U.S.C. 154(b) by 873 days.

(21) Appl. No.: 17/613,485

(22) PCT Filed: Apr. 2, 2020

(86) PCT No.: PCT/IB2020/053174

§ 371 (c)(1),
(2) Date: Nov. 22, 2021

(87) PCT Pub. No.: WO2020/245669

PCT Pub. Date: Dec. 10, 2020

(65) Prior Publication Data

US 2022/0242732 A1 Aug. 4, 2022

(30) Foreign Application Priority Data

Jun. 5, 2019 (IN) ............................ 201921022338

(51) Int. Cl.
*C01B 21/50* (2006.01)

(52) U.S. Cl.
CPC .......... *C01B 21/50* (2013.01); *C01P 2004/32* (2013.01); *C01P 2006/11* (2013.01)

(58) Field of Classification Search
CPC ... C01B 21/50; C01P 2004/32; C01P 2006/11
(Continued)

(56) References Cited

U.S. PATENT DOCUMENTS 4,120,911 A 10/1978 Davidson

FOREIGN PATENT DOCUMENTS

CN 1076172 A 9/1993
CN 1400161 A 3/2003
(Continued)

OTHER PUBLICATIONS

Tianjin University (CN 1400161 A)—English translation (Year: 2003).*

(Continued)

*Primary Examiner* — Anita Nassiri-Motlagh

(57) ABSTRACT

The present disclosure describes about a free flowing sodium nitrite and a method (200) of obtaining the free flowing for sodium nitrite. The method (200) may comprise various steps such as optimizing (202) the concentration of SNI, heating (206) of sodium nitrite slurry at 50 to 600 rpm, gradually cooling (208) the heated mass below 45° C., filtering (210) the wet mass, drying a filtered mass (212), and sieving (214) the dried mass to obtain the free flowing sodium nitrite comprising a spherical or oval shape granules. The spherical or oval shaped granules of SNI obtained has a moisture content of less than 0.15%, mesh size of more than 60 BSS in an amount 60-80% of the total content the particle size of at least 0.25 mm in an amount 60-80% of the total content, angle of repose between 25° to 37° and Hausner ratio of 1.03 to 1.17.

3 Claims, 3 Drawing Sheets

(58) Field of Classification Search
USPC .......................................................... 423/385
See application file for complete search history.

(56) References Cited

FOREIGN PATENT DOCUMENTS

| | | | |
|---|---|---|---|
| CN | 1182024 | C | 12/2004 |
| CN | 102078752 | A | 6/2011 |
| EP | 0754651 | B1 | 12/1998 |
| IN | 106744748 | A | 5/2017 |

OTHER PUBLICATIONS

BASF Technical Information, Sodium Nitrite grades, M 6066e, May 2002 (Year: 2002).*

Fitzpatrick, J.J., Powder properties in food production systems. In Handbook of Food Powders. (editors: Bhesh Bhandari, Nidhi Bansal, Min Zhang, Pierre Schuck), Woodhead Publishing, 2013. (Year: 2013).*

* cited by examiner

FREE FLOWING SODIUM NITRITE AND METHOD OF PRODUCTION

CROSS-REFERENCE TO RELATED APPLICATIONS AND PRIORITY

The present application claims priority from Indian Patent Application no. 201921022338 filed on 5 Jun. 2019, incorporated herein by a reference.

TECHNICAL FIELD

The present subject matter described herein, in general, relates to a modified nitrite based salts comprising a free flowing property. In particular, the present subject matter is related to sodium nitrite and method of producing the free flowing sodium nitrite.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Sodium Nitrite ($NaNO_2$) (hereinafter referred as SNI) as an inorganic compound in the form of salt of nitrogen oxides (NOx). The form of sodium nitrite is yellowish white crystalline solids. SNI has many applications as one of the starting material or as an additive to the compositions. SNI is also used in many sort of industries such as food additive, curing processes, color enhancers, intermediates of drugs, and source of oxides of nitrogen.

In state of the art, production of sodium nitrite from oxides of nitrogen is carried out by different processes. The solid forms of sodium nitrite has property of solubilizing in water as being highly hydroscopic as well as hygroscopic. The handling, storing and transportation of sodium nitrite is always a tedious task. In another scenario, when the solid forms of sodium hydroxide comes in contact with air, moisture or damp environment or under storage, it forms lumps because of contaminating with moisture or water content. Such contaminated lumps does not qualify as a starting material for highly standardized processes in food industry, pharma industries and other chemical industries. Such lumps are very hard and may not be properly distributed in the further composition.

Therefore, there is a long felt need to develop a modified free flowing sodium nitrite that can be handled easily in various situations and requirements, especially, from storage, transportation, and usefulness perspective.

SUMMARY

Before the present system and its components are described, it is to be understood that this disclosure is not limited to the particular system and its arrangement as described, as there can be multiple possible embodiments which are not expressly illustrated in the present disclosure. It is also to be understood that the terminology used in the description is for the purpose of describing the particular versions or embodiments only and is not intended to limit the scope of the present application. This summary is not intended to identify essential features of the claimed subject matter nor is it intended for use in detecting or limiting the scope of the claimed subject matter.

In one embodiment, the present disclosure describes about a modified free flowing sodium nitrite and method of formation and production of free flowing crystals of sodium nitrite which are spherical or oval in shape. In an embodiment, the modified free flowing sodium nitrite (SNI) is characterized by having a moisture content which is less than 0.15%.

In another embodiment, the present subject matter describes about a method of obtaining a free flowing sodium nitrite. The method may comprise a step of optimizing a concentration of sodium nitrite slurry to a predefined value concentration and specific gravity using a slurry settler unit. The method may comprise a step of transferring a concentrated sodium nitrite slurry from the slurry settler unit to a crystallizer. The method may comprise a step of heating the the crystallizer, comprising slurry mass of sodium nitrite to a predefined temperature under stirring at predefined stirrer speed and a predefined tip speed of for a predefined period of time. The method may comprise a step of cooling the slurry mass of sodium nitrite up to a predefined temperature and reducing stirrer speed to a predefined value after completing a cooling cycle. The method may comprise a step of filtering the wet mass of SNI through centrifuge at a predefined temperature between 45° C.-40° C. The method may comprise a step of drying the filtered mass of sodium nitrite at temperature of 100° C.-130° C. for a time period of 30-120 minutes, by using a drying unit to obtain a dried mass of sodium nitrite. The method may comprise a last step of sieving the dried mass of sodium nitrite to obtain a free flowing sodium nitrite comprising a spherical or oval shape granules with content less than 0.15%.

BRIEF DESCRIPTION OF FIGURES

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Figure 1:
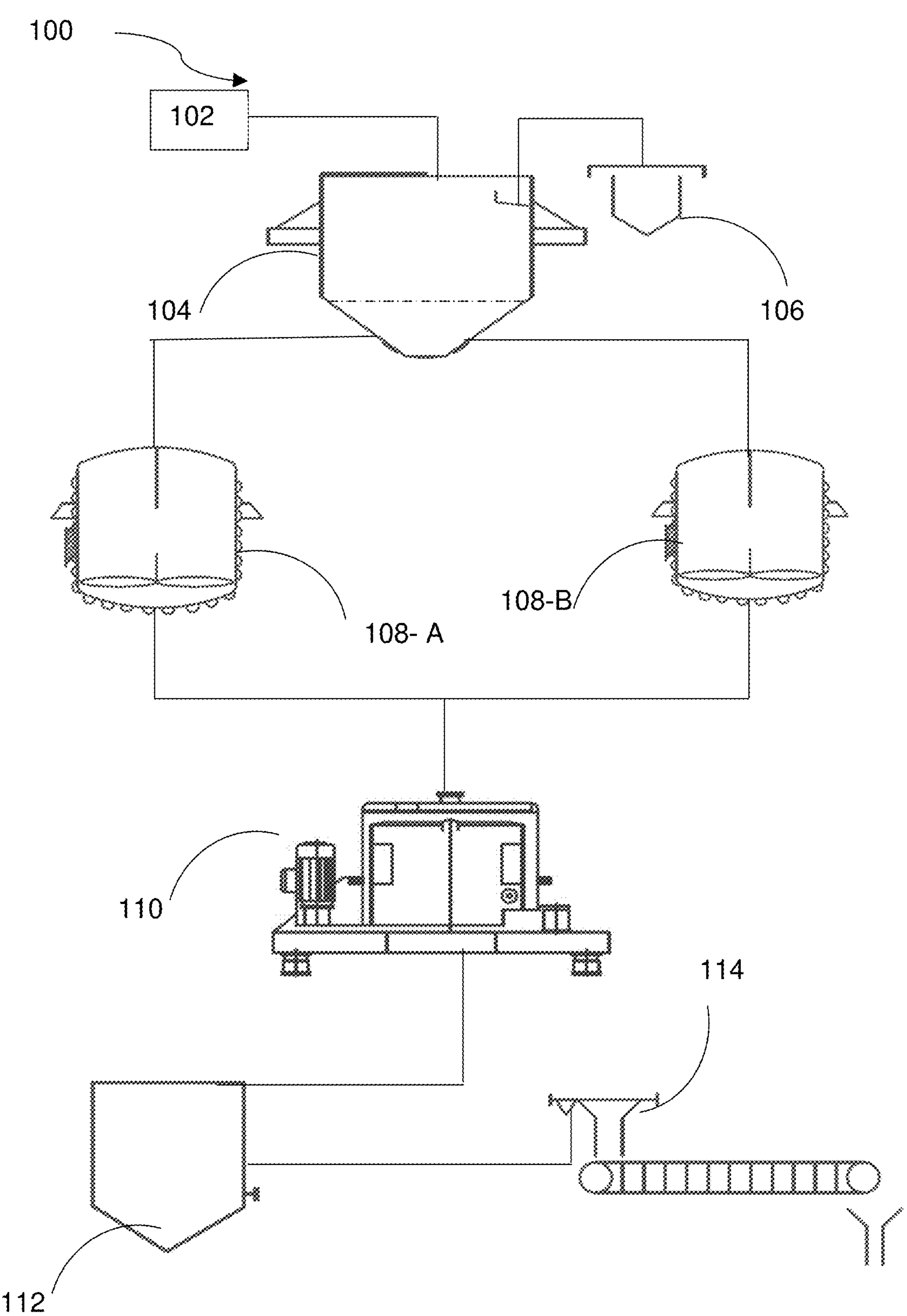
FIG. 1 illustrates a system (100) for obtaining a free flowing sodium nitrite (SNI), in accordance with an embodiment of the present subject matter.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items.

It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are described. The disclosed embodiments are merely exemplary of the disclosure, which may be embodied in various forms.

In state of the art, attempts made in obtaining free flowing sodium nitrite (SNI) resulted in coarser needle shaped crystals, and further when such coarser needle shaped crystals of SNI were pressed with weight, such SNI crystals showed lump formation. Furthermore, addition of an anti-caking agent could also not solve the problem of lump formation because of hygroscopic nature of the sodium nitrite.

After through experimentation and observations, it has been surprisingly deduced by the inventors herein that the free flowing properties of the sodium nitrite crystals are directly attributed to parameters such as shape of the SNI crystals, particle size distribution (PSD) of the SNI crystals, Hausner ratio (tapped/untapped density), angle of repose, moisture pickup rate at 80% RH, and addition of a suitable anti-caking agent.

In order to achieve the characteristics/properties of free flowing SNI, the present subject matter discloses an improved process wherein multiple process modifications are carried out based on process variables including, but not limited to, temperature adjustment, time, type of crystal modifier, type of stirrer, RPM speed of the stirrer, and liquid to solid ratio in the slurry. The improved process proposed herein resulted in obtaining the free flowing SNI with optimal values of the aforementioned parameters (shape of the SNI crystals, particle size distribution of the SNI crystals, Hausner ratio, angle of repose, moisture pickup rate at 80% RH, and addition of a suitable anti-caking agent), the details of which are explained hereinafter as below.

In one embodiment, the sodium nitrite slurry is a crude liquor comprising water crude sodium nitrite, and impurities such as sodium nitrate and traces of chlorides and sulphates.

Now referring to FIG. 1, a system (100) for obtaining a free flowing sodium nitrite is illustrated in accordance with an embodiment of the present disclosure. In an embodiment, the system (100) may comprise a settler feed pump (102) enabled for filling of the sodium nitrite slurry to a slurry settler unit (104) (interchangeably referred hereinafter as "settler"). The system (100) may further comprise an overflowing and recycling unit (106), wherein an inlet of the overflowing and recycling unit (106) is connected to the upper outlet of the slurry settler unit (104), wherein the overflowing and recycling unit (106) is enabled to optimize the concentration of sodium nitrite slurry from initial concentration to a predefined desired concentration in the settler (104). The system (100) may further comprise a crystallizer (108 A and 108 B) connected to the settler (104), wherein the crystallizer (108 A and 108 B) may be enabled to obtain spherical or oval shaped sodium nitrite crystals by predefined stirring, heating and cooling process of the sodium nitrite slurry. The system (100) may further comprise, a centrifuge unit (110) connected to the crystallizer (108A and 108 B), wherein the centrifuge unit (110) is enabled to filter out spherical or oval shaped crystals of sodium nitrite from a wet mass of the sodium nitrite slurry. The centrifuge unit (110) is further connected to a drying unit (112) and enabled to transfer the spherical or oval shaped crystals of sodium nitrite to the drying unit (112). The drying unit (112) is configured for drying and spray coating a wet mass of spherical or oval shaped crystals of sodium nitrite and further enabled to transfer a dried and coated crystals of sodium nitrite to a sieving and conveyer unit (114) (interchangeably referred as "sieving unit" hereinafter). The sieving unit (114) is configured for sieving a spherical or oval shaped granules of a predefined particle size and further to obtain spherical or oval shaped granules of free flowing sodium nitrite.

Figure 2:
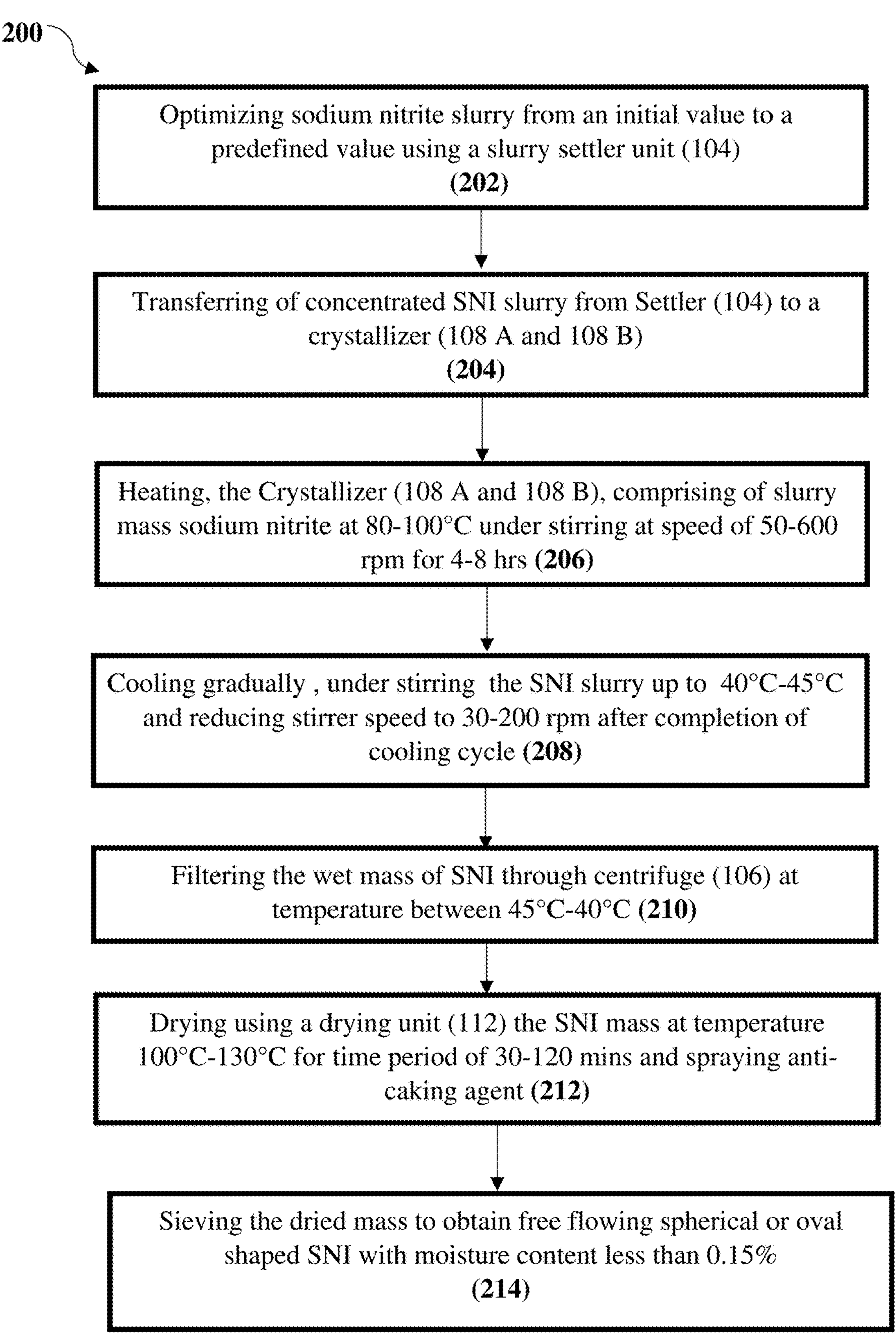
FIG. 2 illustrates a method (200) for developing of free flowing sodium nitrite (SNI) in accordance with an embodiment of the present subject matter.

Now referring to FIG. 1 and FIG. 2, a method (200) of obtaining a free flowing sodium nitrite comprising a spherical or oval shaped crystals of free flowing sodium nitrite ($NaNO_2$) is depicted, in accordance with an embodiment of the present subject matter, the method (200) comprises the following steps:

At step (201), a sodium nitrite slurry from a settler feed pump (102) may be charged to a slurry settler unit (104), with addition time of 10-20 minutes.

At step (202) a concentration of a sodium nitrite (interchangeably referred as 'SNI') slurry, solids in slurry may be optimized using a specifically designed slurry settler unit (104) (interchangeably referred as 'settler'). The step (202) may be carried out to optimize the initial concentration of SNI slurry to a predefined concentration, provided that the specific gravity values of initial concentration and the later predefined concentration are adjusted to a predefined value. The specific predefined adjustment of concentration of the SNI slurry aids to formation of a free-flowing sodium nitrite.

Further, referring to FIGS. 1 and 2, the settler (104) is configured to optimize the concentration of SNI slurry to a predefined value by overflowing a load of SNI slurry charged from the settler feed pump (102), and further recycling the additional liquid to the overflowing and recycling unit (106). In an embodiment, inlet of the overflowing and recycling unit (106) is connected to the upper outlet of the slurry settler unit (104). The overflowing and recycling unit (106) may further be enabled to remove liquid and help to get desired concentration of SNI solids in Settler unit (104).

In one embodiment, the SNI slurry having initial concentration of about 30% with the specific gravity 1.446±0.1 may be transferred from the settler feed pump (102) to settler (104). The settler (104) may further optimize the concentration of SNI slurry to a predefined value of up to 80% and more specifically up to 60% with the specific gravity value 1.615±0.1. The lower portion of the settler (104) is enabled to settle down and further transfer the concentrated SNI slurry to the crystallizer (108 A and 108 B).

At step (204), the concentrated SNI slurry with predefined concentration value and predefined specific gravity may be further transferred to the crystallizer unit (108 A and 108 B) by equal distribution to the crystallizer (108A) and the crystallizer (108B). In accordance with an embodiment of the present subject matter, a concentrated SNI slurry may be further transferred to the crystallizer (108 A and 108 B) through a downward outlet of the settler (104).

At step (206), the concentrated SNI slurry may be heated up to a predefined temperature for a predefined time period followed under predefined stirring conditions to obtain a wet mass of spherical or oval shaped crystals of SNI.

In one embodiment, the crystallizer (108 A and 108 B) may comprise a limpet coil or jacket for controlled heating and cooling of the concentrated SNI slurry. In an embodiment, the crystallizer is enabled to heat (206) the SNI slurry to a predefined temperature and then reduce the temperature up to a predefined value. The crystallizer (108 A and 108 B) may comprise a stirrer with a tip and impeller adjusted to provide specific predefined RPM speed and tip speed.

In an embodiment, a ratio of a diameter (D1) of the crystallizer and a diameter of sweep impeller (D2) may be adjusted to a predefined value as 0.50 and further a ratio of liquid height (L) and diameter of the crystallizer (D1) may be adjusted to a predefined value as 0.11.

In an embodiment, the crystallizer (108 A and 108 B) may comprise a split design type impeller with 4 blade 60 deg pitched blade radial flow turbine (PBT) or a tickler 2 blade 90 deg flatbed turbine to be used as a stirrer in the crystallizer 108 A and 108 B. The stirrer is enabled for crystallizing and obtaining a spherical or oval shaped crystals from the charged SNI slurry. In one embodiment, curved blade radial flow turbine may also be used as an alternative to the pitched blade radial flow turbine (PBT).

In one embodiment, concentrated SNI slurry may be heated up to 85-90° C. by using a steam heating technique. The heating step (206) of the concentrated SNI slurry is carried out under stirring at a speed between 50-600 rpm, preferably between 150-200 rpm, and more preferably 175 rpm for 4-8 Hours of time duration using the pitch blade type (PBT) stirrer. In one embodiment, tip speed of the PBT stirrer may be adjusted between 5-6 m/s, and more specifically 5.50-5.86 m/s.

At step (208), the concentrated SNI slurry may be cooled down gradually, under stirring to a predefined temperature in the crystallizer (108A and 108B), and the stirrer speed may be reduced to a predefined speed to obtain the wet mass of spherical or oval shaped crystals of SNI. In one embodiment, the predefined cooling temperature of the concentrated SNI slurry may be achieved by maintaining water flow in the limpet coil or the jacket and by using low pressure steam jerk technique in the crystallizer (108 A and 108 B).

In one embodiment, the concentrated SNI slurry may be cooled down to 45° C.-40° C., and the stirrer speed is reduced between 30-200 rpm, and more preferably to 100 rpm for obtaining the wet mass of spherical or oval shaped crystals of SNI. Further, low pressure steam jerk technique may be used to restrict the temperature to at least 40° C.

The crystallizer 108 (A and 108 B) is further enabled to transfer the cooled SNI slurry to a centrifuge unit (110) at the temperature between 45° C.-40° C.

At step (210), the wet mass of spherical or oval shaped crystals of SNI is transferred to a centrifuge unit (110) to filter out a solid mass of spherical or oval shape crystals of SNI, wherein the temperature of the wet mass of spherical or oval shaped crystals of SNI at time of filtering may be below 45° C. and up to 40° C.

In one embodiment, the centrifuge unit (110) may be enabled to filter out the wet mass of the SNI slurry at the temperature between 45° C.-40° C. to obtain a filtered mass of SNI. The centrifuge unit (110) is further enabled to transfer the filtered mass of SNI to a drying unit.

At step (212), the solid mass of spherical or oval shape crystals of SNI is transferred to a drying unit (112), wherein the drying unit (112) is a fluidized bed dryer, and wherein the solid mass of spherical or oval shape SNI crystals is dried at temperature between 100° C.-130° C. for a time period of 30-120 minutes, to obtain a dried mass of spherical or oval shape SNI crystals. In an embodiment the dried mass of spherical or oval shape SNI crystals are spray coated with an anti-caking agent.

In an embodiment, the modified free flowing sodium nitrite (SNI) may be obtained coated form. In one embodiment, the free flowing sodium nitrite may be coated with additives such as anti-caking agents. In an embodiment, the method (100) may optionally comprise a step of charging the filtered SNI mass to the fluidized bed dryer and further spraying 5% of anticaking agent over the filtered SNI mass. In one embodiment, the drying unit (112) may be checked after each 5 min interval to identify and break the lumps formed. In one embodiment, the anticaking agent may be selected from stearates of calcium and magnesium, silica and various silicates, calcium silicates, talc, sulfonate, as well as flour and starch or more.

The drying unit (112) is further configured to transfer the dried mass of sodium nitrite to a sieving and conveyer unit (114) (interchangeably referred as "sieving unit)" hereinafter. The sieving unit (114) is configured for sieving a spherical or oval granules of particle size of more than 60 BSS in 40-80% of the total amount of SNI thereby obtaining a free flowing SNI.

At step (214), the dried mass of spherical or oval shape SNI crystals transferred to a sieving unit (114) to obtain free flowing SNI crystals comprising a spherical or oval granules of sodium nitrite.

Now referring to Table 1, the moisture content (Loss of drying) of the free flowing sodium nitrite is characteristically determined as less than 0.15%, enabling the free flowing properties to the sodium nitrite granules having spherical or oval shapes.

Figure 3:
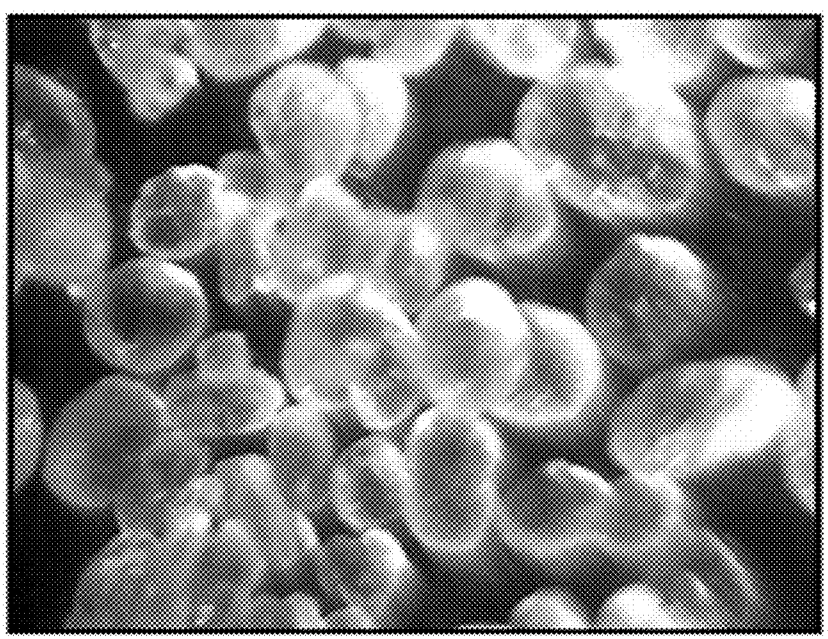
FIG. 3 and FIG. 4 illustrate microscopic images of spherical or oval shaped free flowing sodium nitrite, in accordance with embodiments of the present subject matter.

Now referring to FIG. 3, in an embodiment, the free flowing sodium nitrite may have a spherical or oval shape granules with a mesh size of which is above 60 BSS in an amount 60-80%. Further, the particle size of the free flowing SNI may be between 0.25 mm to 0.7 mm in an amount 60-80%.

Now referring to Table 2 below, in one embodiment, the untapped bulk density and tapped bulk density of the coated free flowing sodium nitrite may be within the range of 0.9-1.14 g/cm$^3$ and 0.9-1.3 g/cm$^3$ respectively. The ratio of untapped bulk density and tapped bulk density may be 1.03 to 1.17. In one embodiment, the angle of repose obtained for additive coated free flowing sodium nitrite may be between 25° to 37°.

In one embodiment, a table depicting the comparison between unprocessed and dried SNI with the free flowing SNI obtained by using the process (200) is represented below. It has been observed that the characteristics values, achieved by carrying out the process (200), such as purity, loss of drying test (moisture content), particles size (+60 BSS) and ratio of tapped and untapped bulk density of end product assist to obtain the free flowing SNI.

TABLE 1

| | Unprocessed SNI | Example 1 | Example 2 | Example 3 |
|---|---|---|---|---|
| SNI characteristics | Lumps | Free flowing | Free flowing | Free flowing |
| Shape | Needle | Spherical or oval | Spherical or oval | Spherical or oval |
| Purity | 99.14 | 99.21 | 99.20 | 99.10 |
| Alkalinity | 0.047 | 0.038 | 0.038 | 0.046 |

TABLE 1-continued

| | Unprocessed SNI | Example 1 | Example 2 | Example 3 |
|---|---|---|---|---|
| LOD (loss of drying) | 0.20 | 0.13 | 0.11 | 0.11 |
| PAG coating | 0.070 | 0.084 | 0.097 | 0.069 |
| Mesh size (+60 BSS) | 68.72 | 60.20 | 61.87 | 61.80 |
| Mesh size (−60 BSS) | 31.28 | 39.80 | 38.13 | 38.20 |

In another embodiment, the characteristic values such angle of repose, tapped and untapped bulk density of SNI crystals measured in terms of Loss of drying (LOD) and particle size, are observed to be advantageous in obtaining free flowing properties to SNI. Some of the results of the implying such observations are depicted in Table 2 represented below.

TABLE 2

| Properties ↓ | Example 3 | Example 4 | Example 5 | Example 6 |
|---|---|---|---|---|
| SNI characteristics Shape | Free flowing spherical or oval | Free flowing spherical or oval | Free flowing spherical or oval | Free flowing spherical or oval |
| Purity | 99.15 | 99.11 | 99.16 | 99.13 |
| Alkalinity | 0.04 | 0.08 | 0.06 | 0.035 |
| LOD (loss of drying) | 0.10 | 0.10 | 0.09 | 0.11 |
| Bulk density (tapped) g/cm$^3$ | 1.25 | 1.269 | 1.2698 | 1.2903 |
| Bulk density (un-tapped) g/cm$^3$ | 1.1200 | 1.1267 | 1.0958 | 1.1267 |
| Bulk density (ratio) | 1.1161 | 1.127 | 1.1587 | 1.1452 |
| Angle of repose | 29.77 | 29.47 | 30.02 | 31.16 |
| Mesh size (+60 BSS) | 62.61 | 66.50 | 60.00 | 60.43 |
| Mesh size (−60 BSS) | 37.39 | 33.50 | 40.00 | 39.47 |

Figure 4:
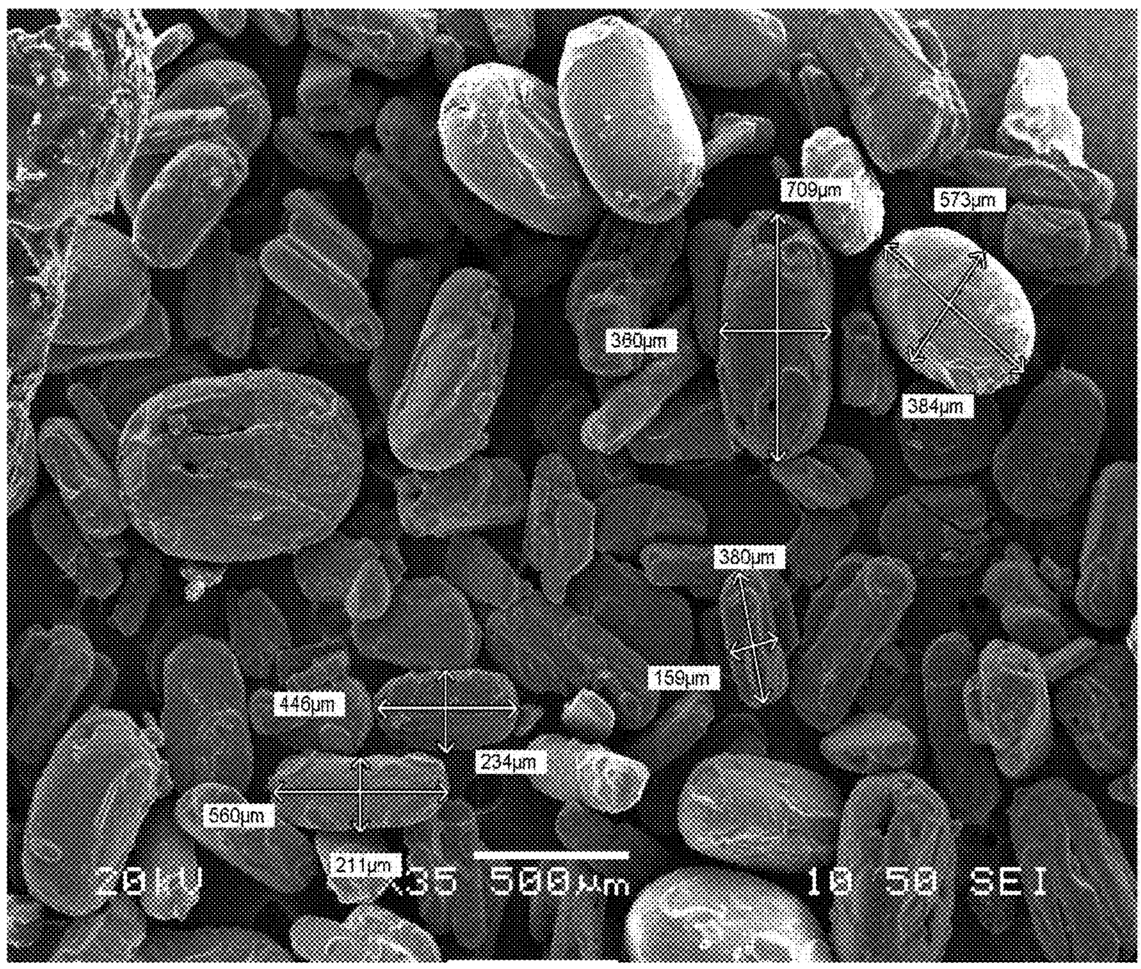

Now referring to FIG. 3 and FIG. 4 microscopic images of a spherical or oval shaped free flowing sodium nitrite are depicted, in accordance with embodiments of the present subject matter. As can be seen, clean, clear and round shape crystals with smooth surface are obtained without any sharp edges observed in needle shaped crystals of SNI.

In accordance with embodiments of the present disclosure, a method of formation of free flowing sodium nitrite described above may have following advantages including but not limited to:

The moisture content of the free flowing sodium nitrite may be less than 0.15%.

The store shelf life of the free flowing SNI may be improved.

The free flowing sodium nitrite (SNI) is obtained wherein a mesh size of the of spherical or oval shaped granules is more than 60 BSS in an amount 60-80% of the total content thereby enabling free flowing property to SNI and making the product easy to handle.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The foregoing description shall be interpreted as illustrative and not in any limiting sense. A person of ordinary skill in the art would understand that certain modifications could come within the scope of this disclosure. The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

We claim:

1. A free flowing sodium nitrite (SNI), comprising a spherical or oval shape granules of sodium nitrite having a mesh size of more than 60 BSS in an amount 60-80% of the total content and a mesh size of less than 60 BSS in an amount 20-40% of the total content, wherein a moisture content of free flowing sodium nitrite is less than 0.15%, wherein the free flowing SNI is coated with at least one anti-caking agent to obtain a coated free flowing SNI, wherein angle of repose obtained for the free flowing sodium nitrite, coated with the at least one anti-caking agent, is between 25° to 30°, and wherein ratio of untapped bulk density and tapped bulk density of the free flowing sodium nitrite, coated with the at least one anti-caking agent, is within a range of 1.03 to 1.17.

2. The free flowing sodium nitrite (SNI) as claimed in claim 1, wherein the spherical or oval granules of sodium nitrite having a mesh size of more than 60 BSS in an amount 60-80% of the total content possess a particle size of at least 0.25 mm.

3. The free flowing SNI as claimed claim 1, wherein the untapped bulk density and tapped bulk density of the free flowing sodium nitrite, coated with the at least one anti-caking agent, is within the range of 0.9-1.14 g/cm3 and 0.9-1.3 g/cm3 respectively.

* * * * *